United States Patent

[11] 3,615,698

[72] Inventor Paul D. Thomas
 Groton, Conn.
[21] Appl. No. 788,321
[22] Filed Dec. 31, 1968
[45] Patented Oct. 26, 1971
[73] Assignee Pfizer Inc.

[54] A METHOD FOR PREPARING SNYTHETIC HAM- AND BACON-FLAVORED COMPOSITIONS
 8 Claims, No Drawings

[52] U.S. Cl. .................................................... 99/140 N
[51] Int. Cl. .................................................... A23l 1/22
[50] Field of Search ............................................99/140, 140 N

[56] References Cited
UNITED STATES PATENTS

| | | | |
|---|---|---|---|
| 2,918,376 | 12/1959 | May et al. ..................... | 99/140 |
| 2,934,437 | 4/1960 | Morton et al. ................ | 99/140 |
| 3,365,306 | 1/1968 | Perret ........................... | 99/140 |

Primary Examiner—Morris O. Wolk
Assistant Examiner—Warren Bovee
Attorney—Connolly and Hutz ABSTRACT: A method for preparing synthetic ham- and bacon-flavored compositions comprising reacting, at elevated temperature, amino acids, sugars, vegetable protein hydrolysate, monosodium glutamate, and edible fat, and, after cooling, further adding 5'-ribonucleotides and hickory-smoke flavor.

3,615,698

A METHOD FOR PREPARING SYNTHETIC HAM- AND BACON-FLAVORED COMPOSITIONS

BACKGROUND OF THE INVENTION

This invention relates to new and useful flavor compositions. More particularly, it is concerned with a process for the preparation of synthetic flavors useful in imparting ham and bacon taste and aroma to foods.

It is known that a flavor such as that of roast beef, boiled beef, or roast pork is obtained by reacting a monosaccharide such as a hexose or pentose with cystine or cysteine in the presence of water at elevated temperature. The teachings of Morton, et al., U.S. Pat. No. 2,934,437 are illustrative thereof.

It is most important in order to obtain a commercially acceptable product, that every nuance and flavor note be reproduced in synthetic flavors exactly as they are tasted and smelled in the natural products. It is, therefore, an object of this invention to provide meatless flavoring compositions which are of uniform quality, readily available in all seasons and economical to use.

SUMMARY OF THE INVENTION

It has now been found that by combining a hexose or pentose with water, cystine or cysteine, and a particular amount of glycine, and thereafter neutralizing the mixture and heating at elevated temperature, ham and bacon flavors are obtained by the addition of hickory smoke, edible fat, hydrolyzed vegetable protein, monosodium glutamate, sucrose and 5'-ribonucleotides. The resulting synthetic flavor compositions have the taste and aroma of natural ham and bacon flavors and are suitable for flavoring gravies and soups.

DETAILED DESCRIPTION OF THE INVENTION

The new method of this invention comprises preparing an initial mixture in aqueous medium of a hexose or pentose monosaccharide or mixtures thereof, cystine or cysteine or mixtures thereof, and glycine in an amount to provide from 0.05 to 0.5 part per part by weight of the initial aqueous mixture, neutralizing to a pH of about 6.5 to 7.5 and thereafter heating the initial aqueous mixture at from about 90°–100° C. for about 10 minutes to 4 hours, cooling and thereafter adding a. from about 2 to 15 parts by weight of monosodium glutamate,
b. from about 3 to 15 parts by weight of vegetable protein hydrolysate,
c. from about 1 to 4 parts by weight of sucrose,
d. from about 0.2 to about 15 parts of edible fat,
e. from about .01 to 0.1 part by weight of disodium inosinate or disodium guanylate or mixtures thereof,
f. and about 300–400 p.p.m. of hickory-smoke flavor, heating at about 70°–75° C. for 1 to 4 hours after addition of said glutamate, said hydrolysate and said sucrose, cooling to about 50°–55° C. prior to addition of said ribonucleotide and said flavor, and maintaining said composition at about 50°–55° C. for from about 10 minutes to an hour after all ingredients have been introduced.

Each of the above proportions expressed in terms of parts by weight is based on the weight of the initial aqueous mixture of monosaccharide, cystine or cysteine, and glycine in water. The concentration of hickory smoke-flavor, however, is based on the total weight of the final ham and bacon-flavored composition.

The monosaccharide used in this invention may be a pentose or a hexose or a mixture of both. Illustrative pentoses are ribose, arabinose, xylose and the like; illustrative hexoses are glucose, fructose, galactose, mannose and the like. An especially preferred hexose is dextrose and an especially preferred pentose is arabinose.

The term "vegetable protein hydrolysate" as used herein contemplates digests of protein derived by acid, enzymatic or other hydrolysis of vegetable proteins such as the mixture of plant proteins occurring in cereal grains, especially wheat, and known as gluten. The said protein hydrolysates, which are freely available commercially, comprise the constituent amino acids representative of the source protein.

The choice of hydrolyzed vegetable protein and the type of edible fat play a role in imparting a hamlike or baconlike aroma and taste to the new flavor compositions. When the flavor compositions contain HVP-100, a hydrolyzed vegetable protein obtained from Yeast Products Inc. or Vegamine 69, a product of Griffith Laboratories, and pork lard, a particularly hamlike flavor is obtained. Similarly, a particularly baconlike flavor is obtained by the incorporation of Maggi 3H3 Paste, a hydrolyzed vegetable protein sold by The Nestle Company, and coconut oil or chicken fat.

The 5+-ribonucleotides preferred for the present inventions are the physiologically acceptable, i.e. nontoxic, salts of inosine-5'-phosphoric acid, well known as inosinic acid, and guanosine-5'-phosphoric acid, the latter commonly referred to as guanylic acid. The sodium salts are particularly preferred.

Commercial hickory-smoke flavor preparations are aqueous distillates containing phenolic decomposition products, mixtures of aldehydes and ketones and lower molecular weight carboxylic acids resulting from the combustion of hickory wood. A preferred hickory-smoke flavor is Fermenich Imitation Smoke Flavor 51.676/T. Other hickory smoke flavors used with good results are Charsol (Red Arrow Products Corp.) and Smoke 400, (Old Hickory Products Company).

A specific embodiment of this invention comprises heating in admixture a compound selected from hexose and pentose monosaccharides, or mixtures thereof, and preferably dextrose and arabinose to obtain the optimum flavor, with cystine or cysteine or mixtures thereof in the presence of water, together with glycine in an amount to provide from about 0.05 to about 0.5 parts by weight based on the total weight of this initial mixture. The cystine or cysteine, monosaccharides and glycine are added to the water and the pH is adjusted to an acidity of from about 6.5 to 7.5 . The aqueous mixture is then heated at from about 90° to 100° C. for about 10 minutes to 4 hours, preferably about 2 hours to obtain the best tasting product, and cooled to about room temperature. Water about equal to the weight of the mixture may optionally be added at this time. The acidity of the mixture is readjusted to pH of from about 6.5 to 7.5 and preferably about 6.5 to 7.0 . To the mixture is added from about 2 to about 15 parts by weight of glutamic acid or a physiologically acceptable salt thereof, preferably monosodium glutamate. About 3–15 parts by weight of hydrolyzed vegetable protein and about 1–4 parts of sucrose are also added. The resulting mixture is preferably heated at about 70°–75° C. for about 1 to 4 hours, cooled to about 50°–55° C., and from about 0.2 to about 15 parts of edible fat and from about 0.01 to about 0.1 part of a 5'-ribonucleotide selected from disodium inosinate, disodium guanylate or mixtures thereof, for each part by weight of the initial aqueous mixture, is added. The preferred 5'-ribonucleotide is a 50-50 by weight mixture of disodium inodinate and disodium guanylate. In addition, about 300–400 p.p.m. of hickory-smoke flavor is added, based on the total weight of the final flavored composition. The mixture is stirred for about 10 minutes to an hour at 50°–55° C. and bottled. Alternatively, the fat may be added prior to heating at 70°–75° C., and this is preferred where a ham flavor is desired. The 5'-ribonucleotide is preferably added after heating to avoid decomposition.

A critical feature of this invention is the inclusion of hickory-smoke flavor. Without this ingredient, the compositions would exhibit a flavor characteristic of chicken. The hickory smoke flavor itself is not salty of meaty, and combined with chicken meat it merely gives the flavor of smoked chicken. It is therefore particularly surprising that its inclusion in the present compositions changes their flavor from that of chicken to a distinctly ham- or baconlike flavor.

The following examples are merely illustrative and are not intended to limit the invention, the scope of which is defined by the appended claims.

EXAMPLE 1

BACON-FLAVOR COMPOSITION

In a two-liter, three-neck flask fitted with mechanical stirrer, thermometer and reflux condenser are added the following ingredients:

| | |
|---|---|
| Water | 60 milliliters |
| L-cysteine hydrochloride | 13.0 grams |
| glycine hydrochloride | 6.7 grams |
| dextrose | 10.8 grams |
| L-arabinose | 8.0 grams |

The solution is adjusted to pH 7.0 with 10 ml. of 50 percent aqueous sodium hydroxide and is then heated at 90°–95° C. for 2 hours. After cooling to 20°–25° C., 100 ml. of water is added and the acidity is adjusted to pH 6.8 with 1N sodium hydroxide solution. With the stirrer on, the following ingredients are added:

| | |
|---|---|
| sucrose | 166 grams |
| vegetable protein hydrolysate (a) | 550 grams |
| monosodium glutamate | 530 grams |

(a) Maggi 3

H3 paste, available from Nestle Co., Inc., Food Ingredients Division, White Plains, New York The resulting solution is heated at 70°–72° C. for 4 hours. The mixture is then cooled to 50° C., and 45 grams rendered chicken fat and 1.5 grams of a 50/50 mixture of disodium inosinate and disodium guanylate are added with stirring. The product is blended at 50°–55° C. for 15 minutes. At this time 10.2 grams of a 5 percent solution of hickory-smoke flavor (prepared by dissolving 10.0 ml of Fermenich Imitation Hickory Smoke Flavor 51.676/T in a mixture of 130 ml. of 95 percent ethanol and 60 ml. of water) is added, and stirring is continued at 50°–55° C. for an additional 15 minutes. The resulting paste exhibits a good baconlike aroma and flavor.

EXAMPLE 2

Bacon-Flavor Composition

In a one-liter, three-neck flask fitted with mechanical stirrer, thermometer and reflux condenser, the following ingredients are added:

| | |
|---|---|
| water | 25.0 grams |
| L-cysteine hydrochloride monohydrate | 6.5 grams |
| glycine hydrochloride | 3.35 grams |
| glucose | 5.40 grams |
| L-arabinose | 4.00 grams |

The solution is adjusted to pH 7.0 with 50 percent aqueous sodium hydroxide, and then heated to 90°–95° C. for 2 hours. The reaction mixture is cooled to room temperature and the pH readjusted to 7.0±0.2 with 50 percent sodium hydroxide solution.

The following ingredients are then added with stirring:

| | |
|---|---|
| sucrose | 83.0 grams |
| hydrolyzed vegetable protein (Maggi 3H3) | 275.0 grams |
| monosodium glutamate monohydrate | 294.0 grams |
| coconut oil (Food grade, m.p. 76° F.) | 22.5 grams |

The resulting mixture is heated with stirring at 70°–72° C. for 4 hours. After cooling to 50° C., 750 mg. of a 50/50 mixture of disodium inosinate and disodium guanylate and 5.25 grams of 5 percent hickory-smoke flavor (10 ml. of Fermenich Imitation Smoke Flavor in a mixture of 130 ml. of 95 percent ethanol and 60 ml. of water) are added, and blended for 15 minutes at 50°–55° C. to obtain a thick bacon-flavor paste.

The process is repeated, substituting 9.40 grams of glucose for the glucose and arabinose, and 750 mg. disodium inosinate for the inosinate-guanylate mixture with comparable results.

EXAMPLE 3

Bacon-Flavor Composition

The process of example 2 is repeated using Charsol Hickory Smoke Flavor (available from Red Arrow Products Corp. Milwaukee, Wisconsin) in place of Fermenich Imitation Hickory Smoke Flavor 51.676/T, with comparable results.

EXAMPLE 4

Bacon-Flavor Composition

The process of example 1 is repeated using L-cystine hydrochloride in place of L-cysteine hydrochloride with comparable results.

EXAMPLE 5

Bacon-Flavor Composition

A series of bacon-flavor compositions is prepared by the procedure of example 2, substituting for the glucose the following hexoses: galactose, mannose and fructose; and for the arabinose the following pentoses: ribose and xylose. Substantially the same results are obtained.

EXAMPLE 6

Ham-Flavor Composition

The following ingredients are combined in a two-liter, three-neck flask equipped with stirrer, thermometer and reflux condenser:

| | |
|---|---|
| water | 75 milliliters |
| L-cysteine hydrochloride monohydrate | 16.3 grams |
| glycine hydrochloride | 8.4 grams |
| D-glucose | 13.5 grams |
| L-arabinose | 10.0 grams |

The resulting solution is adjusted to pH 7.0 with 50 percent sodium hydroxide solution, and then heated at 90°–95° C. for 2 hours. The reaction mixture is cooled to room temperature, 38 ml. of water added, and the solution again adjusted to pH 7.0±0.2 with sodium hydroxide solution.

The following ingredients are then added with stirring:

| | |
|---|---|
| sucrose | 208 grams |
| hydrolyzed vegetable protein (b) | 619 grams |
| monosodium glutamate monohydrate | 735 grams |
| pork lard | 56 grams |

(b) HVP-100

, available from Yeast Products, Inc., Paterson, New Jersey.

The resulting paste is stirred for 4 hours at 70°–72° C. After cooling to 50°–55° C., it is further treated with 1.88 gram of 50/50 mixture of disodium inosinate and disodium guanylate and 12.5 grams of 5 percent hickory-smoke solution (10.0 ml. of Fermenich Imitation Hickory Smoke Flavor in a mixture of 130 ml. of 95 percent ethanol and 60 ml. of water). The product is blended at 50°–55° C. for 30 minutes. The resulting brown paste has a definite, pleasing ham flavor and aroma.

EXAMPLE 7

Ham-Flavor Composition

The process of example 6 is repeated using Vegamine 69 (available from Griffith Laboratories, Inc. Chicago, Illinois) in place of HVP-100, with comparable results.

EXAMPLE 8

Ham-Flavor Composition

The process of example 6 is repeated using Smoke 400 (available from Old Hickory Products Company, Woodstock, Georgia) in place of Fermenich Imitation Hickory Smoke Flavor, with comparable results.

What is claimed is:

1. A method for making ham- and bacon-flavored compositions which comprises preparing an initial mixture in aqueous medium of hexose or pentose monosaccharide or mixtures thereof, cystine or cysteine or mixtures thereof, and glycine in an amount to provide from about 0.05 to about 0.5 part per part by weight of said initial aqueous mixture, neutralizing to a pH of about 6.5 to 7.5 and thereafter heating said aqueous mixture at from about 90° to 100° C. for about 10 minutes to 4 hours, cooling and thereafter adding a. from about 2 to 15 parts by weight of monosodium glutamate,
b. from about 3 to 15 parts by weight of vegetable protein hydrolysate,
c. from about 1 to 4 parts by weight of sucrose,
d. from about 0.2 to about 15 parts by weight of edible fat,
e. from about 0.01 to 0.1 part by weight of a ribonucleotide selected from disodium inosinate, disodium guanylate, and mixtures thereof,
f. and about 300–400 parts per million by weight of hickory smoke flavor, heating at about 70°–75° C. for 1 to 4 hours after addition of said glutamate, said hydrolysate and said sucrose, adding said edible fat either just prior to or after said 70°–75° C. heating step, cooling the 70°–75° C. material to about 50°–55° C. prior to addition of said ribonucleotide and said hickory-smoke flavor, and maintaining said composition at about 50°–55° C. for from about 10 minutes to an hour after all ingredients have been introduced, said parts by weight being based on the weight of said initial aqueous mixture, and said parts per million being based on the weight of said flavored composition.

2. The method of claim 1 wherein said fat is added prior to said 70°–75° C. heating step.

3. The method of claim 1 wherein said fat is added after said 70°–75° C. heating step.

4. The method of claim 1 wherein said hexose is dextrose and said pentose is arabinose.

5. The method of claim 1 wherein said edible fat is coconut oil.

6. The method of claim 1 wherein said edible fat is pork lard.

7. The method of claim 1 wherein said edible fat is chicken fat.

8. The method of claim 1 wherein said ribonucleotide is a mixture of equal parts by weight of disodium inosinate and disodium guanylate.